United States Patent [19]
Aronowitz

[11] 3,867,034
[45] Feb. 18, 1975

[54] LASER ANGULAR RATE SENSOR BIASING APPARATUS

[75] Inventor: Frederick Aronowitz, Roseville, Minn.

[73] Assignee: Honeywell Inc., Minneapolis, Minn.

[22] Filed: Nov. 16, 1973

[21] Appl. No.: 416,518

[52] U.S. Cl.............................. 356/106 LR, 350/150
[51] Int. Cl............................ G01b 9/02, G02f 1/26
[58] Field of Search ...... 356/106 LR; 350/150, 151, 350/157

[56] References Cited
UNITED STATES PATENTS

| | | | |
|---|---|---|---|
| 3,462,708 | 8/1969 | McClure | 356/106 LR |
| 3,466,565 | 9/1969 | Rigrod | 350/157 |
| 3,473,031 | 10/1969 | White | 356/106 LR |
| 3,729,724 | 4/1973 | Ahearn et al. | 350/151 |
| 3,756,689 | 9/1973 | Hammond et al. | 350/157 |

Primary Examiner—Vincent P. McGraw
Attorney, Agent, or Firm—Charles J. Ungemach; Albin Medved; John S. Munday

[57] ABSTRACT

Electro-optical apparatus for preventing lock-in in a laser angular rate sensor. A Faraday material is placed between two wave plates, the birefringence of each wave plate varying in response to applied electric fields. The two wave plates may be positioned so that the principal axes of their index ellipses are substantially orthogonal to one another. A cyclic voltage of high frequency is applied to each wave plate to rapidly and cyclically vary its birefringence. This achieves biasing apparatus having a longer effective optical path length first in one direction and then in the opposite direction.

3 Claims, 2 Drawing Figures

3,867,034

LASER ANGULAR RATE SENSOR BIASING APPARATUS

BACKGROUND OF THE INVENTION

This invention relates generally to laser angular rate sensors and more particularly concerns an improvement in apparatus for eliminating the "lock-in" phenomenon by electro-optical means.

It is well known in the laser angular rate sensor art that one of the factors affecting accuracy at low rotation rates is a phenomenon called lock-in. This phenomenon arises from coupling between the two counter-rotating monochromatic light beams, which tend to oscillate together when low angular rates are being measured. The effect is discussed in an article entitled "The Laser Gyro" by J. E. Killpatrick, published in *IEEE Spectrum*, October, 1967, pages 52 through 54. The Killpatrick article mentions that when the output of the laser gyro is observed as a function of rotation rate, at high rates the time averaged difference in frequency between the counter-rotating light beams is nearly proportional to the rotation rate. However if the input rate is reduced, the frequency difference between the two counter-rotating light beams falls to zero before the input rate goes to zero. This results from back scattering in the laser cavity, which causes coupling of the oscillators; hence frequency synchronization occurs when their frequencies approach one another.

To eliminate this problem, some means of artificially biasing one or both of the oscillators to maintain a frequency difference higher than the lock-in frequency is typically used. In the prior art two types of biasing schemes are common. One scheme utilizes mechanical biasing in which the laser angular rate sensor is continually rotated back and forth mechanically and thus is rotating at a rate greater than the lock-in rate most of the time. An alternative scheme utilizes electro-optical biasing with a Faraday material and two quarter wave plates placed in the laser cavity. This is shown in FIG. 11 of the Killpatrick article at page 53. In addition, U.S. Pat. No. 3,373,650 to J. E. Killpatrick for Laser Angular Rate Sensors discusses the lock-in phenomenon and in FIG. 1 shows electro-optical biasing apparatus used to deal with the lock-in phenomenon.

Conventional electro-optical biasing apparatus using a Faraday material and two quarter wave plates has significant shortcomings solved by the present invention. The apparatus is highly temperature sensitive, and because the differences in optical path lengths are due to the magnetic field created within the magnetically-active Faraday material, the system is also very sensitive to stray magnetic fields.

One prior art approach to these problems is to periodically switch the current through the coils about the Faraday material, thereby alternating the direction of the magnetic field. This provides a cyclic bias signal which may be averaged in an attempt to eliminate temperature and stray magnetic field effects. One drawback of this approach is that the switching frequency must be at a relatively low value. A typical value of switching frequency with this approach might be 1 Hz. The Faraday material is so temperature sensitive that at useable switching frequencies, significant errors remain unaveraged. In addition, any asymmetry in the switching waveform results in undesirable nullshift.

OBJECTS OF THE INVENTION

The present invention solves these problems by providing electro-optical biasing apparatus in which the bias can be switched at a much faster rate so that the effects of temperature variations and stray magnetic fields on the Faraday material may be more effectively averaged out. In addition, the present invention switches bias without varying the magnetic field applied to the Faraday material. This feature allows the Faraday material to be operated in a magnetic saturation mode which renders the apparatus stray field insensitive.

Accordingly it is the primary aim of the present invention to provide electro-optical biasing apparatus which can switch at a rate rapid enough to allow effective averaging of temperature variations and stray magnetic field effects in a Faraday material.

Another important object is to provide electro-optical biasing apparatus in which no switching of the direction of magnetic field applied to the Faraday material is necessary.

Still another important object is to provide electro-optical biasing apparatus using a Faraday material in which the material may be maintained in a magnetic saturation mode during biasing apparatus operation.

SUMMARY OF THE INVENTION

In accordance with the invention, these objects are attained by electro-optical biasing apparatus which includes a first means placed in the optical path for increasing the optical path length for polarized light propagating through it in a first direction with its polarization vector rotating in a first sense over the effective optical path length for polarized light propagating through the first means in a second, opposite direction with its polarization vector rotating in the same sense. Placed on opposite sides of the first means are plates of material, each of which is birefringent in response to applied electric fields. These plates have index ellipses which have a predetermined orientation with respect to one another. Second means applies a first varying electric field to one of the plates and a second varying electric field to the other plate. This achieves cyclic variations in the effective optical path length through the first means in each of the first and second directions.

BRIEF DESCRIPTION OF THE DRAWINGS

Other objects and advantages of this invention will become apparent upon reading the following detailed description and upon reference to the drawings, in which.

While the invention will be described in connection with preferred embodiments, the invention is not limited in scope to those embodiments. On the contrary, all alternatives, modifications, and equivalents included within the spirit and scope of the invention as defined by the appended claims are covered.

DETAILED DESCRIPTION OF THE INVENTION

Figure 1:
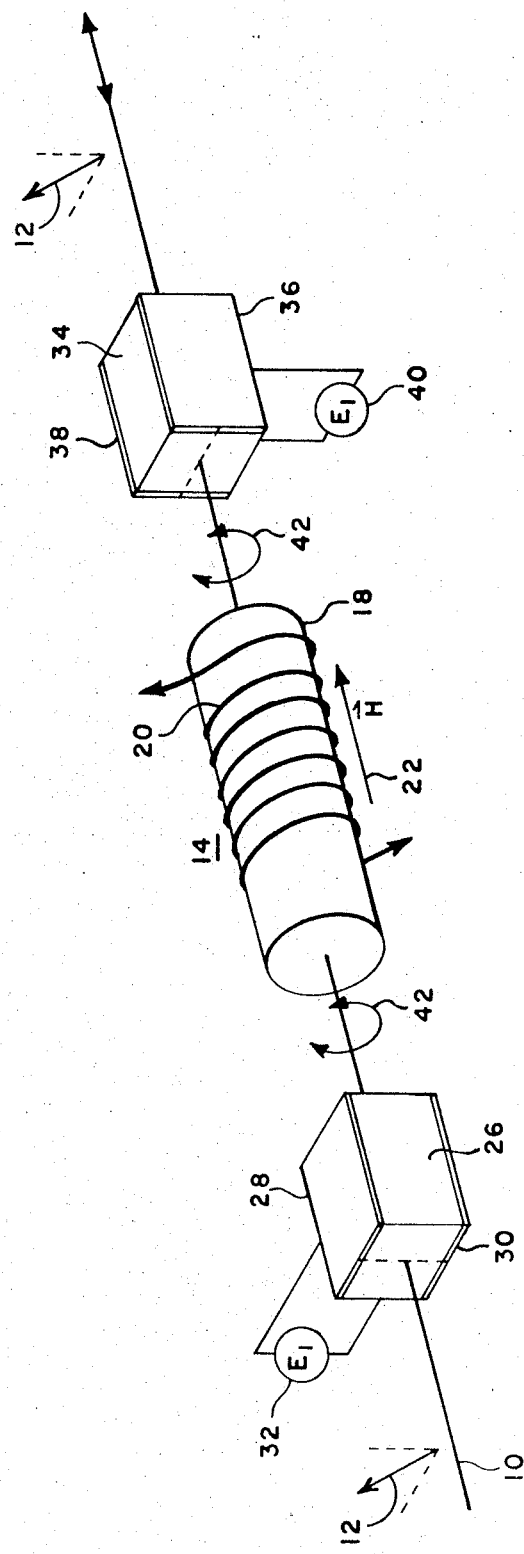
FIG. 1 is a perspective representation of key elements of one embodiment of the electro-optical biasing apparatus.

In FIG. 1, an optical path 10, which may be a portion of the optical path within a laser angular rate sensor cavity, is represented by a solid line extending through a number of elements. Path 10 represents the path along which counter-rotating monochromatic light beams propagate during laser angular rate sensor operation. The fact that the beams are counter-rotating is indicated by the opposing arrows at the far right of path 10. During their passage through most of the path length of the laser cavity, the two monochromatic light beams are plane or linearly polarized. Arrows 12 represent the polarization vectors of the light beams traveling towards and away from the biasing apparatus of FIG. 1.

The main nonreciprocal biasing element in the apparatus is a standard Faraday material 14. Faraday material 14 is an element which increases the optical path length (results in a phase shift) for polarized light whose electric vector rotates in one sense when the light passes through it in one direction with respect to the path length for the same type of light when it passes through the cell in the opposite direction. Faraday material 14 may be composed of a magnetically-active optical material 18 about which is coiled a conductor 20. For simplicity, optical material 18 is shown in FIG. 1 as a right circular cylinder. In actual practice, however, the faces of the cylinder will preferably be cut at Brewster's angle to minimize back scattering into the laser cavity. By passing a current in the appropriate direction through the coils of conductor 20, a magnetic field H represented by arrow 22 is established. Although not essential to biasing apparatus operation, it is preferable that Faraday material 14 and the level of current through conductor 20 be matched so that material 14 is continuously in a magnetic saturation mode. Once the field H is established, Faraday material 14 acts as a nonreciprocal phase element for circularly or elliptically polarized components of light which pass through it.

Although FIG. 1 illustrates a Faraday material in which the magnetic field is provided by passing electric current through a coiled conductor, it should be noted that other means of providing the magnetic field may be equally acceptable. For example, it is possible to use a magnetically-active optical material comprised of one of the rare earth orthoferrites (such as yttrium iron garnet) which exhibits large Faraday rotations in combination with a permanent magnet used to maintain the material in a saturation mode.

The linearly polarized light represented by arrows 12 is converted to circularly or elliptically polarized light by one of two plates adjacent Faraday material 14. These plates are placed adjacent to Faraday material 14 on opposite sides thereof. A first electrically birefringent wave plate 26 is placed to the left of Faraday material 14 in FIG. 1. Unlike typical quarter wave plates, plate 26 is comprised of a material which exhibits birefringence in at least one pair of axes in response to an applied electric field. Among the crystalline materials from which wave plates exhibiting this property may be constructed are lithium niobate and barium-sodium niobate.

Care must be exercised in selection of the crystal orientation and applied field direction if efficient biasing apparatus is to be achieved. It is well known that each crystalline material has a characteristic index ellipsoid which describes the index of refraction of the crystalline material for all possible light propagation directions. To illustrate, an article entitled "Electro-Optic Coefficients in Single-Domain Ferroelectric Lithium Niobate" authored by P. V. Lenzo et al. and published in *Journal of the Optical Society of America*, May, 1966, volume 56, pages 633–635 defines the index ellipsoid for lithium niobate in terms of its crystallographic axes.

For purposes of constructing the wave plates, the crystalline material selected preferably will have an index ellipsoid such that the choice of propagation direction and applied electric field direction will result in wave plates having no natural birefringence, but exhibiting electric field dependent birefringence. While it may be possible to select a light propagation direction by inspection of the index ellipsoid, it will probably be necessary to experiment somewhat with the electric field direction to get the desired effect. Once propagation direction and applied field direction have been selected, the magnitude of applied electric field is chosen to achieve the desired bias or non reciprocal phase shift. For most efficient operation, each wave plate will preferably be oriented so that the principal axes of the index ellipse are at 45° angles to the plane of polarization of incoming light. These principal axes are represented in FIG. 1 by a pair of dashed lines drawn 45° angles to arrows 12 which represent the polarization vectors for incoming light.

To illustrate the process of constructing a wave plate, consider construction of a wave plate using lithium niobate as described in the above-referenced Lenzo et al. article. The index ellipsoid for the material is given by $$(N_o^{-2} - r_{22}E_2 + r_{13}E_3)x_1^2 + (N_o^{-2} + r_{22}E_2 + r_{13}E_3)x_2^2 + (N_e^{-2} + r_{33}E_3)x_3^2 + 2(-r_{22}E_1)x_1x_2 + 2(r_{51}E_2)x_2x_3 + 2(r_{51}E_1)x_3x_1 = 1 \quad (1)$$

where $x_1$, $x_2$, $x_3$ are the crystallographic $a$, $b$, and $c$ axes respectively;

$E_1$, $E_2$, and $E_3$ are the electric field components in the $x_1$, $x_2$, and $x_3$ directions respectively;

$r_{ij}$ are fundamental electro-optical coefficients for the crystal; and $N_o$ and $N_e$ are the ordinary and extraordinary indices of refraction for the material respectively.

To avoid natural birefringence effects, it is preferable to orient the wave plate so that no component of the laser field lies along the $x_3$ axis. By inspection of equation (1), it is readily apparent that it is sufficient if the applied electric field is along the $x_2$ axis. For such a case, $E_1 = E_3 = 0$ and equation (1) becomes $$(N_o^{-2} - r_{22}E)x_1^2 + (N_o^{-2} + r_{22}E)x_2^2 + N_e^{-2}x_3^2 + 2r_{51}Ex_2x_3 = 1 \quad (2)$$

Application of the electric field will result in rotation of the index ellipsoid. Therefore, to determine the index of refraction along the $x_1$ and $x_2$ axes, it is necessary to make a principal axis transformation. This will determine the proper orientation of the crystal in the laser cavity. It is straightforward to show that the rotation $\psi$ about the $x_1$ axis is given by $$\tan 2\psi = 2r_{51}E [N_o^{-2} - N_e^{-2} + r_{22}E]^{-1} \quad (3)$$

If a 3mm thick lithium niobate crystal, a 1.15μm He-Ne laser, and the voltage necessary to cause half wave rotation are used, the rotation about the $x_1$ axis can be calculated to be 1.2 arc-minutes, almost a negligible value.

The transformed index ellipsoid is given by $$(N_o^{-2} - r_{22}E)x_1^2 + (N_o^{-2} + r_{22}E + G)x_2'^2 + (N_e^{-2} - G)x_3'^2 = 1 \quad (4)$$

where $$G \approx (r_{51}^2 E^2)/(N_o^{-2} - N_e^{-2} + r_{22}E) \quad (5)$$

From equations (4) and (5), the maximum birefringence is given by $$\Delta n = (N_o^{-2} - r_{22}E)^{-1/2} - (N_o^{-2} + r_{22}E + G)^{-1/2} \quad (6)$$

or $$\Delta n = N_o^3 E r_{22} [1 + (r_{51}^2 E)/[2r_{22} (N_o^{-2} - N_e^{-2})]] \quad (7)$$

The preferred orientation of the crystal in the laser cavity is such that the laser beam will be along the $x_3'$ axis, the $x_3$ axis rotated slightly as a result of the applied electric field. To obtain the maximum effect from the wave plate the crystal will preferably also be oriented so that the plane of polarization of the laser beam lies at a 45° angle with respect to the $x_1 - x_2'$ axis.

In FIG. 1, one of the crystallographic axes of wave plate 26 is shown as a dotted line. Note that it is at a 45° angle to the plane of polarization 12. Since rotation of the index ellipsoid caused by application of the electric field is very small, it is not represented in FIG. 1. In fact, biasing apparatus according to the present invention could neglect this small rotation and still operate satisfactorily. Wave plate 26 is sandwiched between a pair of conductive layers 28 and 30. In practice, these conductive layers may be thin layers of deposited metal. Power source 32 provides a cyclic voltage of predetermined frequency and amplitude, hence an electric field applied in a predetermined direction across the crystal.

In a similar manner to the right of Faraday material 14 in FIG. 1 is a wave plate 34 constructed from a material similar to that of wave plate 26. Wave plate 34 is preferably placed so that two of its crystallographic axes are perpendicular to their counterparts in wave plate 26. The orthogonality between like axes in wave plates 26 and 34 may be used to maintain like sense rotation of the polarization vector for light passing through Faraday material 14 in either direction, and is also present between quarter wave plates used in prior art Faraday material biasing apparatus. Wave plate 34 has an electric field applied across it in a predetermined direction by conductors 36 and 38 in combination with a power source 40, which provides a cyclic voltage of predetermined frequency and amplitude identical to that applied to wave plate 26. The signals from power sources 32 and 40 are preferably synchronized so that a plane polarized monochromatic light beam will be transformed into an elliptically polarized beam in passing through one wave plate before encountering the Faraday material, then will be recombined by the second wave plate after exiting the cell.

It should be noted that, alternatively, operable biasing apparatus according to the present invention may be constructed by orienting wave plates 26 and 34 with their crystallographic axes parallel. If this is done, the cyclic signals from power sources 32 and 40 should be maintained 180° out of phase.

Power sources 32 and 40 may be any standard sources of cyclic voltage provided at a frequency high enough so that the averaging of temperature and stray magnetic field effects will occur. Typically this must be at a rate of the order of $10^4$ Hertz. The amplitude should be selected so that the maximum desired phase shift is achieved by the electric field created thereby.

A pair of semi-circular arrows 42 and 42' are shown on opposite sides of Faraday material 14 and represent rotation of the polarization vectors which occurs when the plane polarized light beams pass through crystals 26 and 34.

During operation of the embodiment shown in FIG. 1, plane polarized light polarized at an angle of approximately 45° to the principal axes (neglecting rotation, essentially the same as crystallographic axes) of the index ellipses of wave plates 26 and 34 enters these wave plates. As a result of the electric field dependent birefringence of the wave plates, a degree of rotation is imparted to the polarization vector and it becomes elliptically or circularly polarized. The elliptically or circularly polarized light is affected by Faraday material 14, with one of the counter-rotating light beams acquiring a phase shift with respect to the other. Each beam then passes through the second of the two wave plates and is reconverted to linearly polarized light. Of course, the longer effective optical path length through the Faraday material in one direction will introduce a phase shift.

One key advantage of the present invention flows from the important difference in the way bias reversal occurs. Instead of field reversal caused by changing the direction of current flow in the coils 20 of Faraday material 14, the apparatus applies a cyclic voltage variation to wave plates 26 and 34 through cyclic voltage sources 32 and 40. This structural change permits switching at a much more rapid rate, of the order of $10^4$ Hertz. At such a rapid switching rate, variations in temperature which are a significant error source at lesser rates are averaged out and have no substantial net effect upon the rate output.

Figure 2:
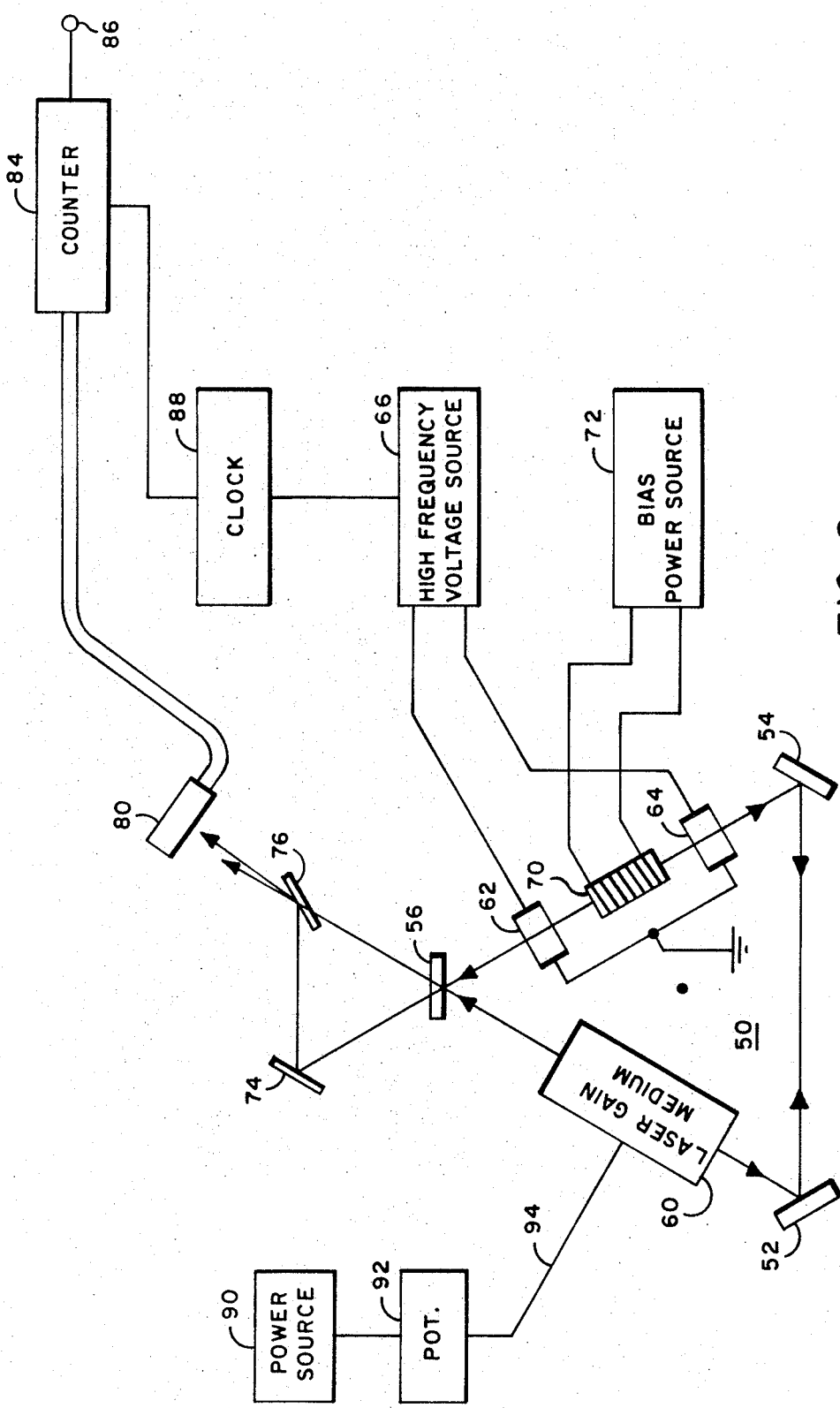
FIG. 2 is a block diagram of a laser angular rate sensor incorporating one embodiment of the electro-optical biasing apparatus of the present invention.

FIG. 2 illustrates a laser angular rate sensor in which the biasing system of the present invention might be applied. In that figure a polygonal ring laser generally designated 50 is shown. The form of ring laser 50 is an equilateral triangular optical path. Corners of the equilateral traingle are defined by two totally reflecting mirrors 52 and 54 and a partially reflecting mirror 56. Arrows along the equilateral triangular path represent counter-rotating monochromatic light beams established and maintained by a laser gain medium 60 shown as a block in the optical path. Also in the polygonal path is an electro-optical biasing apparatus comprising two wave plates 62 and 64 connected to a high frequency voltage source 66, and a Faraday material 70. High frequency voltage source 66 provides a cyclic output voltage which is applied to wave plates 62 and 64 to cause the birefringence of each to vary with time. Connected to provide an electromagnetic field to energize Faraday material 70 is a bias power source 72.

Located just above partially reflecting mirror 56 is the readout apparatus for the laser angular rate sensor of FIG. 2. It comprises a totally reflecting mirror 74, a partially reflecting mirror 76, and a detector array 80. Detector array 80 is connected to a counter 84 which counts interference fringes representative of the angular rate measured by the rate sensor.

Counter 84 has an output terminal 86 at which a count indicative of the measured angular rate periodically appears. Counter 84 is controlled and synchronized by a clock 88. Clock 88 receives, from high frequency voltage source 66, information concerning the cyclic voltage applied to wave plates 62 and 64. It transforms this information into START and STOP signals which start and stop counter 84 so that it counts for an integer number of cycles of the signal from source 66. So controlled, bias counts will be eliminated and output terminal 86 will provide the actual measured angular rate directly.

The operation of the laser angular rate sensor shown in FIG. 2 will now be briefly described. Laser gain medium 60 establishes counter-rotating monochromatic light beams in the equilateral triangular ring laser path defined by the three mirrors 52, 54, and 56. Since mirror 56 is only partially reflective, a portion of one of the counter-rotating light beams passes through it, is slightly refracted, and strikes totally reflecting mirror 74. That portion is reflected from mirror 76 towards partially reflecting mirror 76. A portion of the oppositely rotating laser beam passes through mirror 56 and impinges upon partially reflecting mirror 76. A portion of that beam is transmitted through mirror 76. It is combined with the reflected portion from mirror 74 at a detector array 80 to form an interference fringe pattern. The movement of light and dark bands of the interference fringe pattern across detector array 80 is measured by the array in combination with counter 84.

Bias power source 72 establishes a current through the windings which surround the magnetically-active material in Faraday material 70. The current flow establishes a magnetic field throughout the Faraday material, which magnetic field results in a longer effective path length for circularly or elliptically polarized light traveling in one direction than for light of the same polarization traveling in the opposite direction. The plane polarized counter-rotating light beams in the laser path are converted to elliptically or circularly polarized light as each passes through one of the two wave plates 62 or 64 before reaching Faraday material 70. After being transmitted through material 70, each beam is reconverted to plane polarized light by one of the wave plates.

High frequency voltage source 66 is continuously applying a cyclically varying voltage across the wave plates 62 and 64. Since the wave plates are selected to exhibit birefringence in the presence of an applied electric field, the birefringence of each is continuously varying in a cyclic manner in accord with the output of source 66. This change in birefringence results in continuously varying polarization of each of the beams entering Faraday material 70. Since the change in path length is the result of the Faraday material's effect on light of a particular polarization, the effective path length continuously changes also, resulting in a cyclic bias effect. Thus the bias applied to the laser angular rate sensor alternates in sign with time at the frequency of high frequency voltage source 66. High frequency voltage source 66 will provide the information concerning its cyclic output to clock 88. Clock 88 will in turn start and stop counter 84 after an integer number of cycles to eliminate bias counts from the measured rate. In this manner a laser angular rate sensor with protection against lock-in at low rates, as well as relative insensitivity to stray magnetic fields and temperature effects will be achieved.

It will be apparent to those of skill in the art that biasing apparatus according to the present invention is not limited to use with a laser angular rate sensor of the type shown in FIG. 2, but that FIG. 2 is intended merely to illustrate one way of utilizing one specific embodiment of the invention. For example, a permanent magnet rather than bias power source 72 could have been used. In addition, different readout apparatus utilizing a prism rather than mirrors 56, 74, and 76 might have been used. In any case, biasing apparatus which fully satisfies the aims and advantages set forth above has been provided. While the biasing apparatus has been described in connection with certain specific embodiments, the invention is not limited to those embodiments. All embodiments within the spirit and broad scope of the appended claims are covered.

What is claimed is:

1. Apparatus for use in the optical ring path of a ring laser to prevent mode locking, which comprises:
   a. a Faraday material adapted to be placed in said optical ring path;
   b. a first wave plate exhibiting electric field dependent birefringence and being characterized by a first index ellipse, said first wave plate in the optical ring path adjacent said Faraday material;
   c. a second wave plate exhibiting electric field dependent birefringence, being constructed of the same material as said first wave plate and being characterized by a second index ellipse, said second wave plate placed in the optical ring path adjacent said Faraday material at the opposite end from said first wave plate, with the second index ellipse oriented so that its principal axes are not parallel with the correspondent principal axes of the first index ellipse; and
   d. means for applying an electric field which varies cyclically in magnitude and polarity to said first and second wave plates, to achieve cyclic variations in the optical path length around the laser in each direction.

2. The apparatus of claim 1 wherein the means for applying an electric field to said wave plates generates a voltage which varies cyclically at a frequency of the order of $10^4$ Hertz.

3. The apparatus of claim 1 wherein the first and second wave plates are oriented so that the correspondent principal axes of the first and second index ellipses are substantially perpendicular to one another.

* * * * *